United States Patent [19]

Lindsey et al.

[11] 3,753,239

[45] Aug. 14, 1973

[54] DATA FLOW IN A MACHINE LOG SYSTEM

[75] Inventors: Royce D. Lindsey; Larry G. Smith, both of Austin, Tex.

[73] Assignee: International Business Machines Corporation, Armonk, N.Y.

[22] Filed: June 30, 1971

[21] Appl. No.: 158,347

[52] U.S. Cl. .............................................. 340/172.5
[51] Int. Cl. ............................. G06f 7/00, G11c 7/00
[58] Field of Search .................................. 340/172.5

[56] References Cited

UNITED STATES PATENTS

| | | | |
|---|---|---|---|
| 3,576,433 | 4/1971 | Lee et al. | 340/172.5 |
| 3,275,995 | 9/1966 | Hagopian | 340/172.5 |
| 3,360,781 | 12/1967 | Boehnke | 340/172.5 |
| 3,483,523 | 12/1969 | Cogar et al. | 340/172.5 |
| 3,587,056 | 6/1971 | Banziger et al. | 340/172.5 |

*Primary Examiner*—Gareth D. Shaw
*Attorney*—John L. Jackson and Hanifin and Jancin

[57] ABSTRACT

An efficient system is disclosed for utilization in the storage address log portions of a typewriting system including a multi-page buffer and a substantially larger serial bulk memory. A keyboard-printer is connected to a multi-page buffer. Also connected to the multi-page buffer is a serial bulk memory which, in the preferred embodiment, is a magnetic tape cassette. The operator can temporarily store textual characters in the multi-page buffer and can transfer the buffer contents to the tape in the tape cassette for permanent storage.

An address logging system is provided for assigning storage blocks on the tape for reading or recording. Included in this address logging system is an electronic static shift register (SSR) having stored therein indicia representative of the availability or unavailability for storage of each storage block on the tape. Also stored in the SSR of the address logging system are job identifying codes input by the operator from the keyboard as well as storage block address codes corresponding to the particular storage blocks on which are recorded textual characters included in a particular job. After each store or delete operation on one of the storage blocks on the tape, the contents of the SSR are recorded on the first storage block on the tape. Thus, the contents of the log stored on the tape, in the event of power failure which would destroy the contents of both the multi-page buffer and the SSR, are current up to the last completed job.

An efficient system is disclosed herein whereby the equal bit length job identifying codes and block address codes are distinguished from each other by the provision of a particular bit position in each code which is automatically set if the code is a job identifying code and automatically reset if the code is a block address code. Further, another bit position of a particular job identifying code and the block address codes associated with that job is automatically set upon the operator's inputting the particular job code from the keyboard. The availability or unavailability for storing characters on the storage blocks as well as the address of a particular block is determined by the set or reset status of a sequence of separate bits, with each bit individually representing a storage block on the tape.

5 Claims, 9 Drawing Figures

INVENTORS
ROYCE D. LINDSEY
LARRY G. SMITH

John L Jackson

ATTORNEY

Patented Aug. 14, 1973 3,753,239

7 Sheets-Sheet 2

DATA FLOW IN A MACHINE LOG SYSTEM

BACKGROUND OF THE INVENTION

1. Field of the Invention

This invention relates to printing systems in general and more particularly to a system for utilization in a logging system in an editing type of printing system which utilizes an electronic working store for revision capabilities and also includes a bulk store which is in two way communication with the electronic store with the bulk store being automatically positioned through use of a machine log system which keeps account of the location of each page of a job and the next available location for storage on tape.

2. Description of the Prior Art

The prior art devices include the magnetic tape typewritter. One of the problems encountered when utilizing a single tape magnetic tape typewritter is that when a revision is to be made, the revision cannot be more extensive than the original recording or the previously recorded material will be overrun. This probelm was alleviated on the magnetic tape typewriter by providing a second tape wherein the contents of the original tape is transferred to the second tape with revisions (insertions and deletions) performed during the transfer. However, the operator of the two station magnetic tape typewriter had to be aware of the position of the recorded material on the two tapes.

Another type of system which has recently been developed is one in which a buffer, such as a electronic shift register is employed, to store single pages of material. These systems are quite flexible in that data can be readily added and deleted. However, the practical storage capability of these systems is relatively limited due to the high cost of the shift registers involved. Furthermore, these memories are volatile in nature such that electrical power must be maintained to the memory to preserve the stored data. To alleviate the limited storage in this latter type of system and substnatially eliminate the volatility problem, it has been proposed that a bulk storage be added such that the contents of the shift register can be dumped into the bulk storage and then later recalled. The problem presented however, again, is quite similar to the one presented by the dual station magnetic tape typewriter, i.e. that the operator must know the location of each of the pages of each of the jobs and must then input to the system the address on tape of the page desired. Additionally, the operator then must also keep a record of the blocks on tape available for storage. The invention described in copending application Ser. No. 158,346, filed June 30, 1971, having Frederick T. May as inventor, entitled "Machine Log System" and assigned to the assignee of this application improves on this second type of system in that it addresses the problem of record keeping of jobs. With the present system the operator no longer need think tape or even be aware that the pages are being dumped onto tape, instead an automatic record keeping system is provided which is job-oriented. With this system the operator identifies a job with a job code and then the pages, upon depression of the store button by the operator, are automatically stored on the tape. Then, when desired, by entering the job code, the appropriate pages are automatically retrieved and loaded into the working buffer. The system also is designed such that during revision work, additional pages can be added to a job and the location of the pages of the job automatically maintained, even though the pages may not be in sequential order on the tape.

SUMMARY OF INVENTION

An efficient system is utilized in the storage address log portions of a typewriting system including a keyboard-printer connected to a multi-page buffer to which is also connected a serial bulk memory. In the preferred embodiment, the serial bulk memory is a tape cassette in which a magnetic tape is divided into a plurality of storage blocks. Textual characters input at the keyboard can be temporarily stored in the multi-page buffer and can be transferred to storage blocks on the tape for permanent storage. An address logging system is provided for assigning storage blocks on the tape for reading or recording. Included in the address logging system is an SSR having stored therein indicia representative of the availability or unavailability for storage of each block on the tape. Also stored in the SSR are job identifying codes input by the operator from the keyboard as well as storage block address codes corresponding to the particular storage blocks on which are recorded textual characters included in a particular job. After each store or delete operation on one of the storage blocks on the tape, the contents of the SSR are recorded on the first storage block on the tape. Thus, the contents of the log stored on the tape, in the event of power failure which would destroy the contents of both the multi-page buffer and the SSR, are current up to the last completed job.

The system described herein utilizes equal bit length job identifying codes and block address codes. These codes are distinguished from each other by the provision of a particular bit position in each code being automatically set if the code is a job identifying code and reset if the code is a block address code. Another bit position of a particular job identifying code and the block address codes associated with that job is automatically set upon the operator's inputting the particular job code from the keyboard.

The availability or unavailability for storing characters on the storage blocks is determined by the set or reset status of a sequence of separate bits, with each bit individually representing a storage block on the tape. By sampling the sequence of separate bits to determine their set or reset status, the address of the storage block closest to the beginning of the tape may be readily ascertained.

Thus, a system is provided which enables the log stored in the SSR as well as the log stored on the frist block of tape to require a substantially small amount of storage space. The SSR can, therefore, be of a substantially short length, and only one block on the tape is required for storage of the log on the tape.

DESCRIPTION OF THE PREFERRED EMBODIMENT

Figure 1:
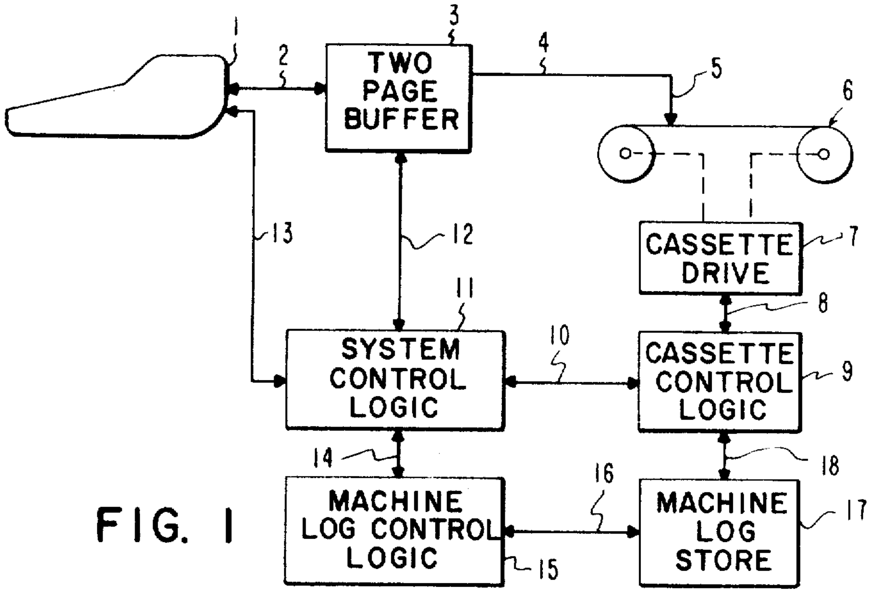
FIG. 1 is an overall block diagram illustrating the various control circuitries utilized along with the typewriter two-page buffer and magnetic tape cassette.

For a more detailed description of the subject invention, refer first to FIG. 1. In FIG. 1 is shown a printer or typewriter in two way communication along line 2 with a two-page buffer 3. The printer or typewriter may be of the type described in U.S. Pat. No. 3,297,124 to Donald E. Sims, Ser. No. 540,777, filed Apr. 6, 1966, issued Jan. 10, 1967, and entitled "Data Recording and Printing Apparatus Capable of Responding to Changed Format", said patent also describing a keyboard suitable for use as the keyboard described below in this application. The two-page buffer may be of the type described in U.S. Pat. No. 3,675,216 to Randell L. James, Ser. No. 104,888, filed Jan. 8, 1971, issued July 4, 1972, and entitled "No Clock Shift Register and Control Technique". The two-page buffer 3 is activated along line 4 to read data from and record onto the magnetic tape cassette generally indicated at 6 by means of head 5. The two-page buffer is also in two-way communication with the system control logic 11 which in turn is a two-way communication with the typewriter 1. The system control logic may be of the type described in U.S. Pat. No. 3,400,371 to Gene M. Amdahl, et al., Ser. No. 357,372, filed Apr. 6, 1964, issued Sept. 3, 1968, and entitled "Data Processing System". The systems control ogic is also a two-way communication along line 10 with the cassette control logic 9 which in turn controls along line 8, the cassette drive 7 for positioning of the tape at desired locations. The system control logic is further in two-way communication with the machine log control logic 15 which again is in active two-way communication along line 16 with the machine log store 17 and it is further in a two-way communication along line 18 with the cassette control logic 9. As will become apparent, for purposes of simplifying the operation description the logic has been broken down into systems control logic, machine log control logic and cassette control logic.

Briefly in operation an operator keys print characters and control characters by means of the printer 1. The print characters are applied along line 2 and stored in the two page buffer, while the control characters for controlling the printing operation are applied along line 13 to the system control logic 11. The system control logic controls the entering of data in the two-page buffer. Thus, as later will be described in more detail, the system control logic in accordance with the control signals received along line 13 from the printer operates to perform certain desired editing functions on the data stored in the two-page buffer. These operations may include delete and insert operations. At the conclusion of the typing of a page, the operator depresses a store key and a page is stored from the two-page buffer under control logic 11 onto a preselected block of tape. The particular location that the page is stored at is controlled by the systems control logic acting in conjunction with the machine control logic 15 which automatically interrogates the machine log store 17 to determine which of the blocks on the tape are available for storage. The machine log store then provides an indication to the cassette control logic 9 to cause the cassette drive 7 to position the tape to the desired block. At the completion of the storage the address of the block of tape on which the page was stored is identified or made available through the machine log control logic and systems control logic such that the machine log store which is also stored at the beginning of the cassette tape can be updated. The updating of the machine log store on the tape is done at the completion of each job to keep the machine log store on the tape current in the event that a power failure occurs such that the data in the machine log store 17 which is a electronic shift register would be lost.

Figure 2:
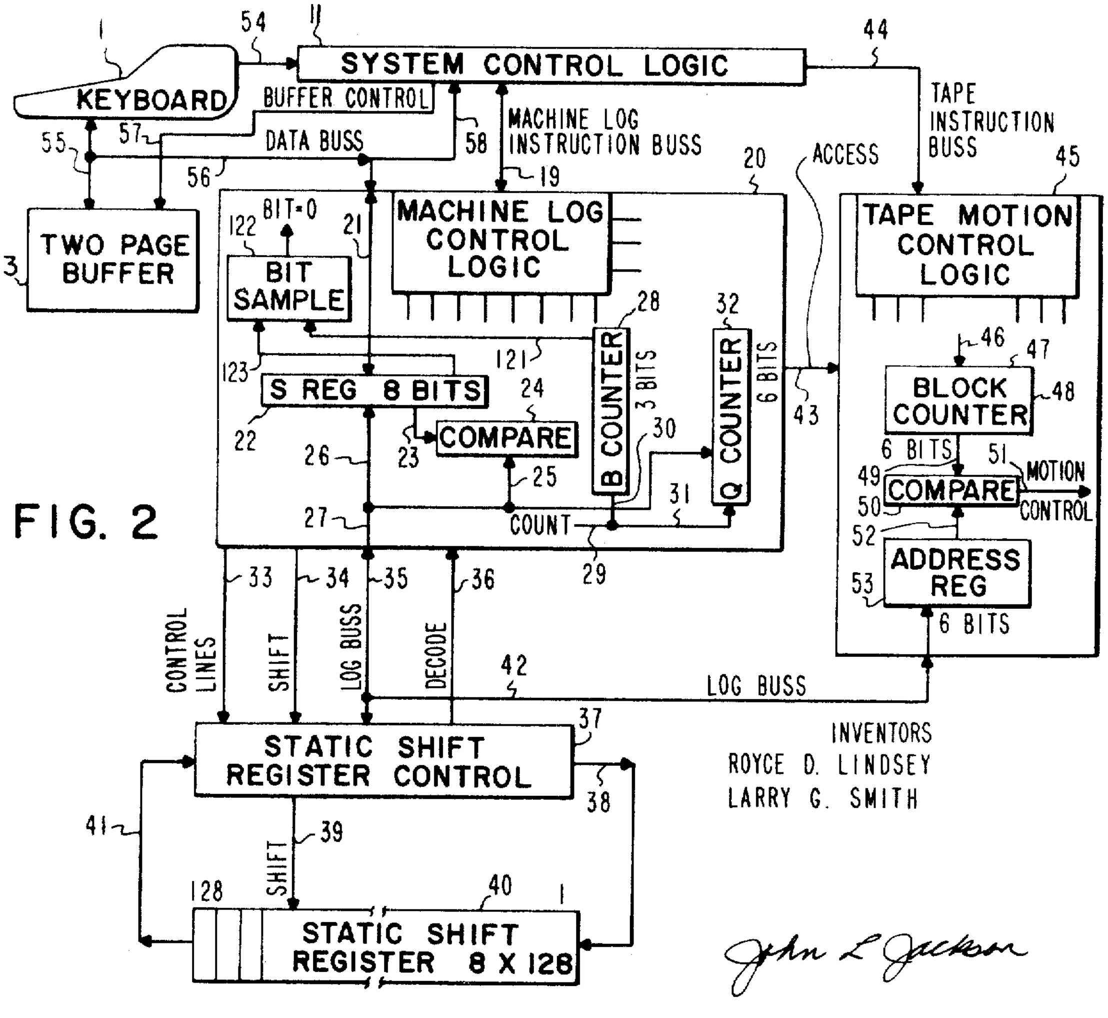
FIG. 2 is a more detailed block diagram similar to that of FIG. 1 showing details of certain of the logic employed.

For a more detailed description of the generalized system of FIG. 1, refer next to FIG. 2. In FIG. 2, there is again shown a keyboard 1 connected along line 54 to a systems control logic and the keyboard is also in two-way communication along line 55 with the two-page buffer 3 and is further in communication along line 56 with the data buss 58 connecting the systems control logic to the machine log control logic generally indicated at 20. The two-page buffer is also connected along line 57 to the systems control logic. The systems control logic is also connected along the machine log instruction buss 19 to the machine control logic 20. With respect to the machine log control logic 20, the entire block 20 is intended to represent the machine log control logic, however, only a portion of the logic is shown, that portion being that which is necessary to provide an understanding of the dtat flow of the system. In FIG. 2 the various logic units control the data flow in accordance with the following discussion. The specific connection of the lines, gating, and timing will not be provided since this is considered to be within the skill and art of the average systems engineer.

The system control logic 11 as shown is further connected along line 44 which is a tape instruction buss to the tape motion control logic 45. Again with respect to tape motion control logic 45, only a portion of the logic which is necessary to understand the operation of the system is shown within the tape motion control logic. As shown in the tape motion control logic 45 there is included an input line 46 to which are applied pulses derived from the tape which as previously described is divided into a number of blocks. Again as will be later described in more detail to access a particular block, a count of the blocks is made and the block counter 47 is stepped each time a pulse is applied to line 46 from the block reader. The output from the block counter is applied along line 49 to a compare unit 50 which also receives an input along line 52 from an address register 53. The address register 53 is loaded with the desired address to be accessed along line 42 which is labeled log buss. Development of this address will be later described in more detail. The output of the compare unit 50 is applied to the cassette motion control to cause motion of the cassette the block corresponding to the address in register 53.

Referring again to the machine log logic 20, the data buss 58 is connected along line 21 to the S register 22 which in turn has an output applied along line 23 to a compare unit 24. The compare unit 24 receives an input along lines 35, 27, and 25 from the log buss which is utilized to sample the contents of the static shift register which holds the machine log. The character applied along lines 35 and 27 can also be applied as will later be described along line 26 to the S register 22 and the output of the S register 22 can also again be applied to the log buss input to the static shift register. The S register is also connected along line 123 to a bit sample 122 which also receives an input along line 121 from B counter 28. As further shown the machine log control logic has control line 33, a shift control line 34 and a decode buss 36 connected to the static shift register control logic 37. The static shift register control logic 37 controls the insertion and deletion of characters as will later be explained in detail. The flow from the static shift register 40 is along line 38 through the static shift register control 37, thence along line 41 and back into the static shift register.

Figure 3:
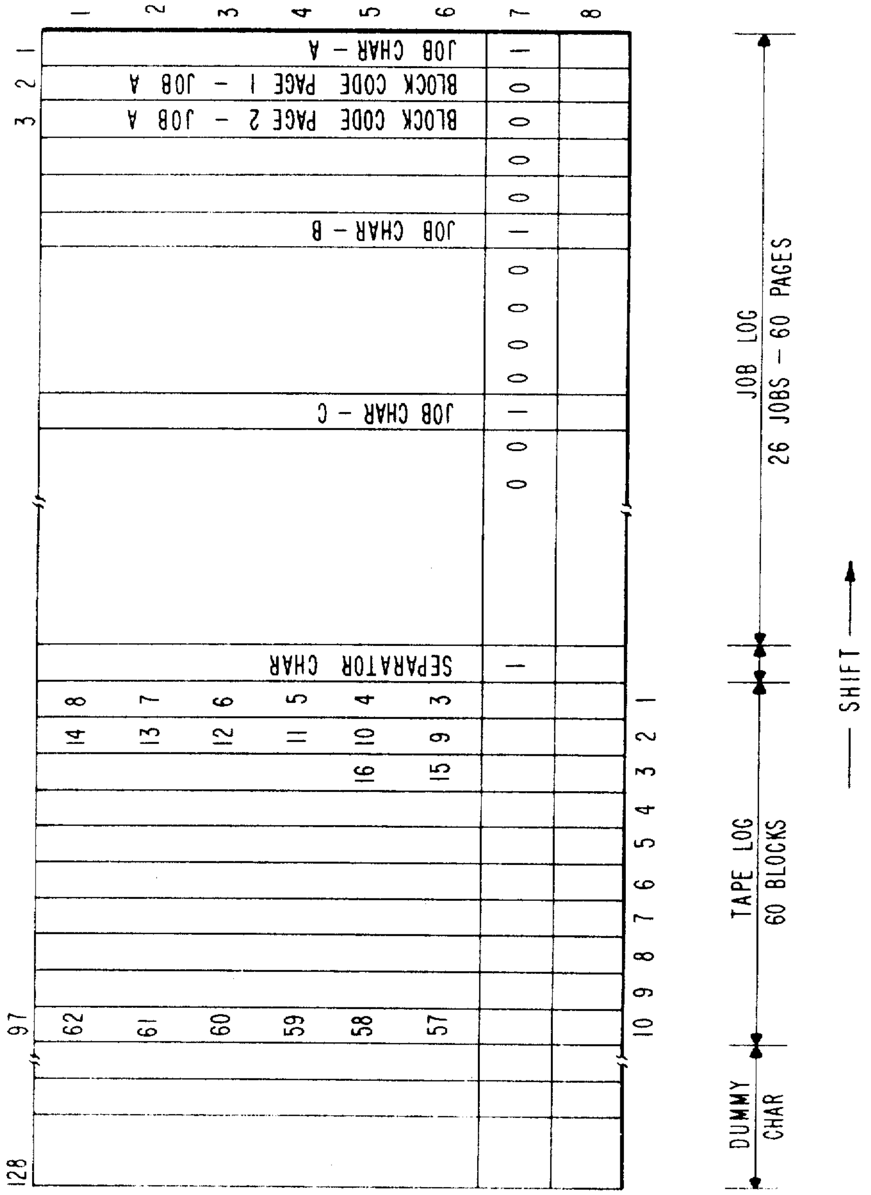
FIG. 3 illustrates the layout of the machine logs on the tape and in the static shift register.

Prior to a detailed operational description of FIG. 2, refer next to FIG. 3 wherein is shown the format of the machine log which is recorded at the beginning of the tape and which is also at the beginning of a recording or reading operation read from the tape and stored in the static shift register 40 to provide a working log. Recorded on the tape in a portion labeled job log are the 26 characters of the alphabet. These characters are then used by the operator to identify the jobs that she is working on. Thus to access job A, the operator depresses the job select key and keys in A. Following the 6 bit codes defining the 26 characters is a separator character separating the job log from the tape log. As shown the tape log is 10 characters in length and as shown since there are 6 bit positions in each character, a total of 60 blocks can be handled. This is accomplished by changing a block bit from zero to one when the block has been used. Thus, in operation of the system, the tape log is read character by character and there is a counter which samples each of the 6 bit positions to identify the first bit position which is a zero and this bit position then defines the first available block on the tape which is available for storage. The building up of this address will be described in detail during a further discussion of FIG. 2 and FIG. 7.

Referring back to the job log as shown, there are 8 bits in each character. The job log identifying characters will have bit 7 on as shown to indicate or distinguish the job character identifying the job from an address derived from the tape log when a page is stored. Thus, as shown, the seventh bit of the block code identifying page 1, job A is off. When the job log is initially recorded on the tape, all of the 26 characters are recorded adjacent each other and as will be described in conjunction with FIGS. 2, 4 and 5 during source recording when the address of a page stored on tape is entered in the machine log following it's job character the remaining job characters are forced to the right. This is ture even though the pages are not recorded on the cassette in sequential order.

Following the machine log which includes the job log and tape log is a sequence of dummy characters which are used to separate, within the static shift register, the tape log from the job log. Since the 26 job characters, the separator code, the 10 character tape log, and at least one dummy code constitute a machine log for an unused tape, and those codes plus 60 block codes constitute a machine log for a fully used tape, the static shift register must have a minimum length of 98 characters. When not all of the blocks are assigned, dummy codes are used to fill up the remainder of the SSR. On tape, the first block is allocated for the machine log followed by 60 blocks which are used for actual recording of pages of information. Each block is separated by a hole in tape which is sensed and counted to control tape positioning.

Figure 6:
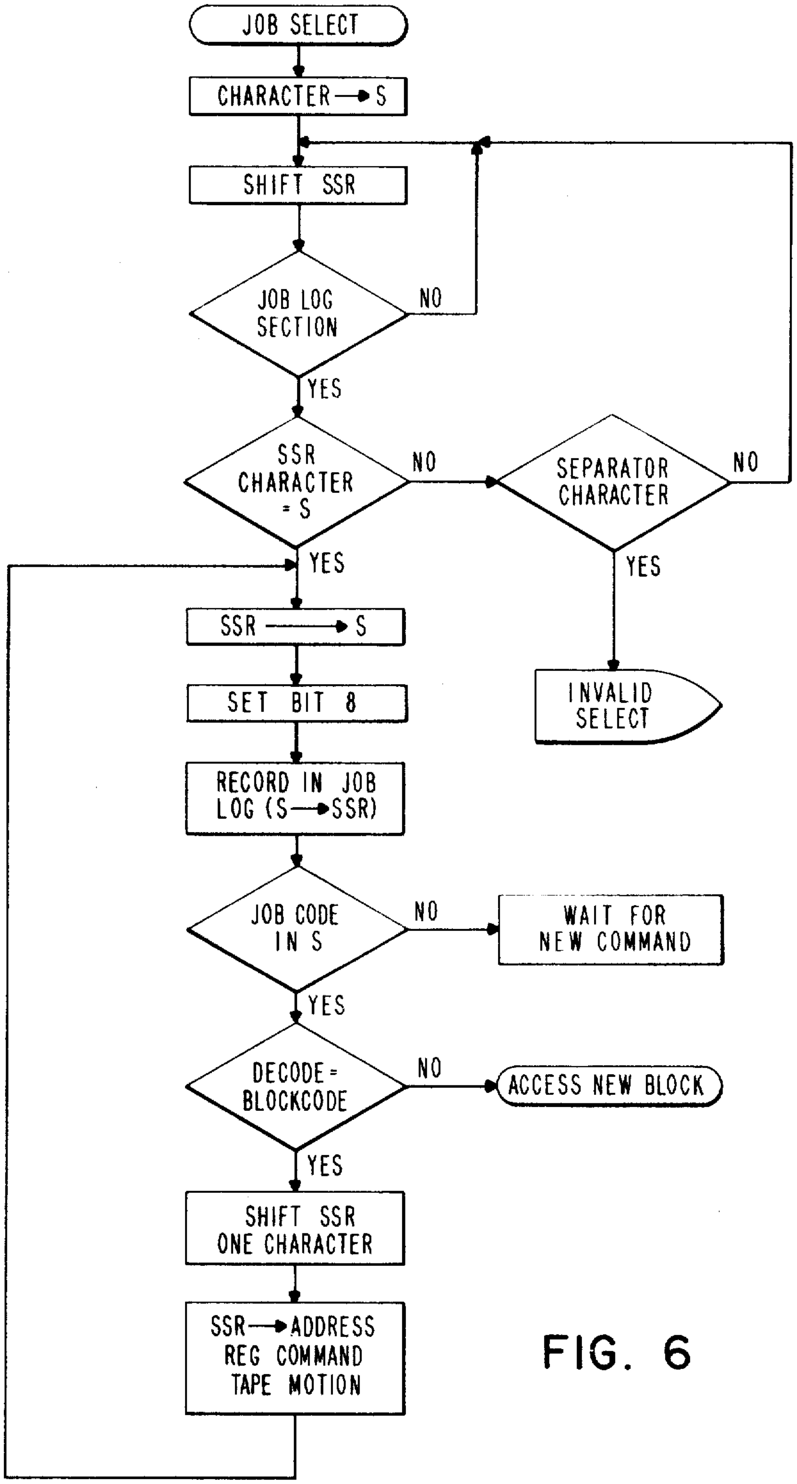
FIG. 6 is a flow diagram of a job select instruction.

Refer again to FIG. 2 for an operational description. The first operation to be described is a job select operation. To further facilitate an understanding of the data flow during this operation refere also to FIG. 6. When the system logic recognizes that a character has been keyed with the select button on the keyboard depressed, this character is put on the data buss along lines 56 at the same time that an instruction is sent along 19 from the systems control logic. The character identifying the job to be selected is then loaded along line 21 into the S register 22. Once a select instruction has been received by the machine log control logic, the static shift register is shifted to the beginning of the job log section by application of shift pulses along line 34 to the static shift register control logic 37. The static shift register (SSR) 40 is then shifted on each clock time and a comparison is made of the output of the shift register which appears on the log buss 35 with the contents of the S register 22. The log is continually shifted until a match is achieved between the character that is contained in the S register and the contents of the shift register which appears on the log buss. Once a match has been achieved the contents of the log buss is transferred into the S register and the eight bit is set which indicates that particular job character has been selected. The job character is then transferred back into the machine log static shift register 40 with the eighth bit on. Looking at the output of the decode 36 from the static shift register, the type of character following the job character can be determined. If it is a block code, the block code will be transferred into the S register and bit 8 will be set. Then the character as before will be transferred back into the machine log. At the time that the block code was put on to the log buss to be transferred into the S register, it was also applied along line 42 to the address register 53 of the tape motion control logic to access or cause the block to be accessed on tape. After the tape motion control logic has caused access to the block an indication of this will be sent back along line 44 to the systems control logic indicating that the first page of the job has been accessed.

There are two other type of situations that can occur in job select. One is that after the job selected has been located in the job log section, the next code appearing in the job log was another job character. This will indicate that there are no blocks existing on tape for the job that has been selected. An indication of this is then been provided back to the system control logic. In other words, source recording would be indicated. If the machine log had been shifted all the way through the job log section and no match between the job log contents, and the contents of the S register was made an indication would be sent back to the system control logic indicating that there is an invalid select (a key other than *a* through *z* was depressed with the select button down).

Figure 7:
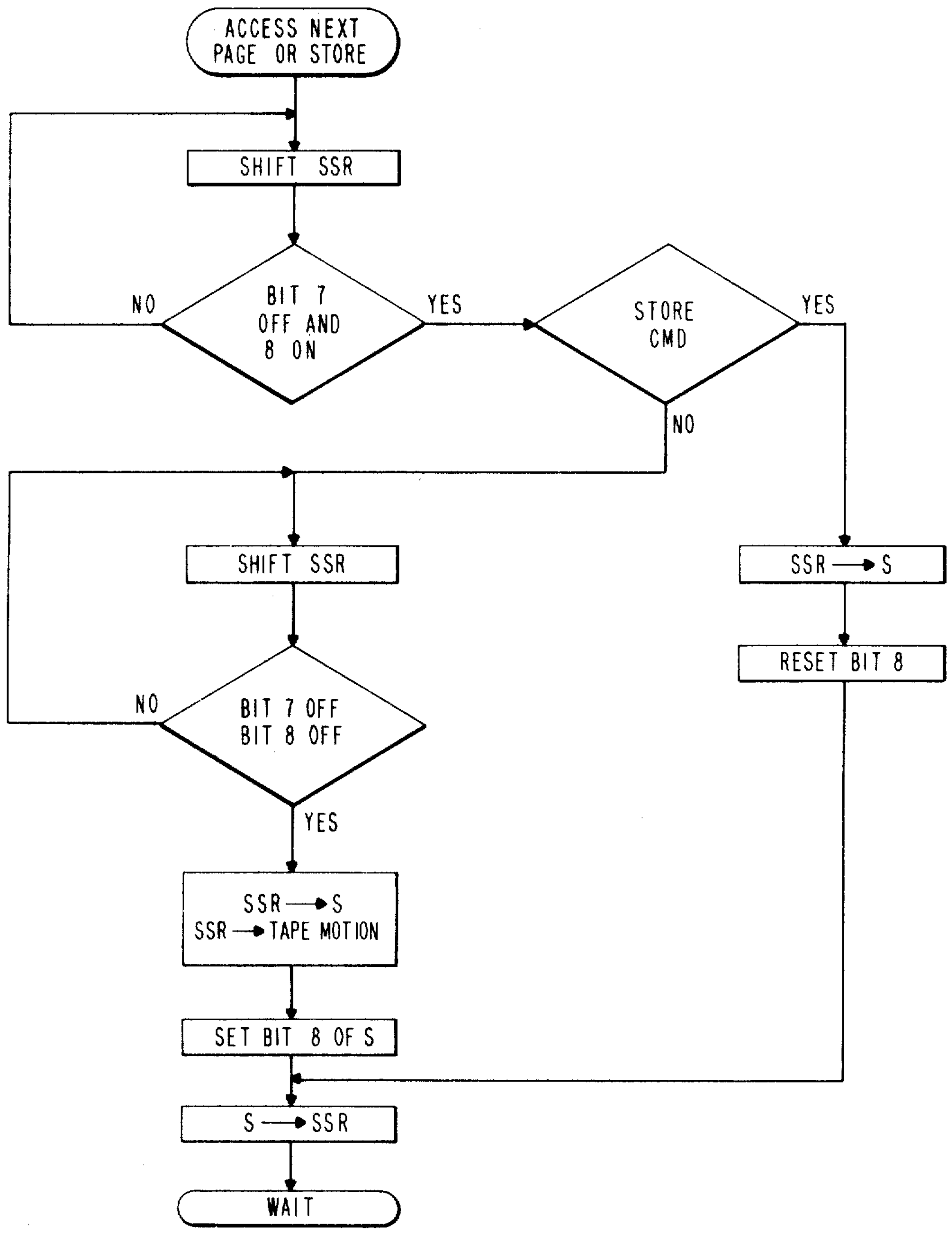
FIG. 7 is a flow diagram of an access next page or store operation.

Refer next to FIG. 7. A second type of instruction generated by the system control logic 11 is to access the next page of a job. This is an instruction that would normally be received after the first page in the job had been accessed since there is normally more than one page of a job in the two page buffer 3. The instructions to access a next page will cause the machine log control logic to shift the static shift register to the job character that has been selected (8 bit on), then shift to the block code following the last block that is resident in the memory (indicated by the eighth bit being on). When this code is found it is placed on the log buss and a command is given along line 44 to the tape motion control logic to access this block and that character is also placed into the S register and the eighth bit is set. This character is then transferred back into the machine log.

The third type of instruction is an instruction to store a page indicating that either a page has been deleted out of the memory or has been recorded. When the store button is depressed on the keyboard, the machine log control logic must clear the eighth bit of the particular block code that has been stored. To accomplish this, the machine log is shifted until the first block with bit 8 on is found. That code is then placed on the log buss and loaded into the S register where bit 8 is reset and then the character is transferred back into the machine log via the log buss.

Figure 8:
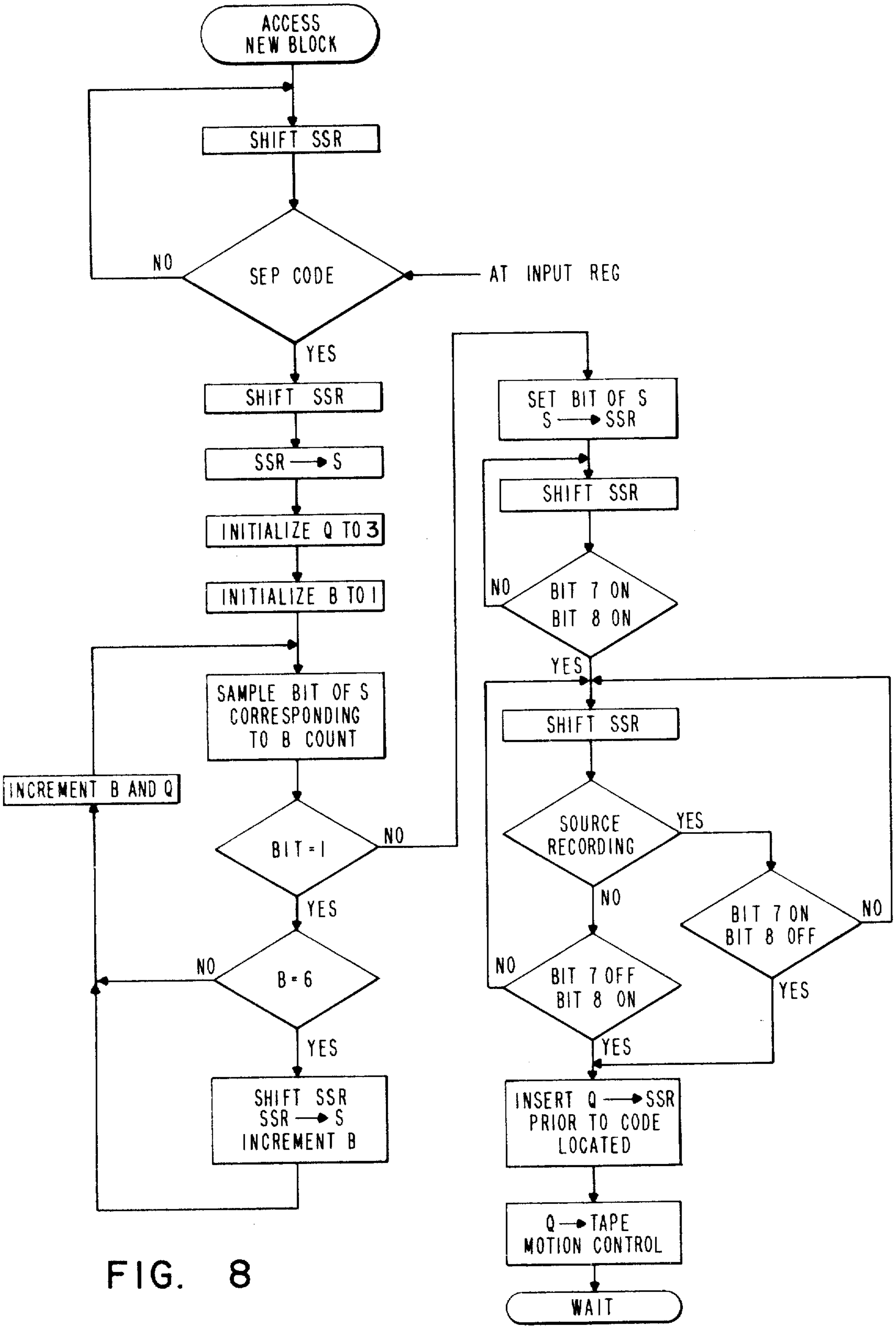
FIG. 8 is a flow diagram of an access new block instruction.

Refer next to FIG. 8. Another type of instruction that is received in the machine log control from the system control logic is an instruction to access a new block on tape. This instruction would be received during source recording when a page is ready to be stored on tape and an available block in which to store that page on tape must be found; or in case of revision when the operator performs excessive insertions requiring the addition of a new page in the job that is being worked on. In this case the machine log is shifted until the separator character is detected as indicated in FIG. 3. The first character following the separator character is the first byte of the tape log section. The tape log section consists of ten characters, using the first six bits in each character with one bit representing one block on tape. The first bit in the first byte being off indicates that the first block on tape is unused. That bit being on indicates it is used. If a bit is on, it can be one of two situations; it is actually called out in the job log as being assigned to a job; or else it could be a block on which we have experienced a hard error and we have flagged that block in the tape log section as being unusable.

To locate an empty block two counters, the B counter 28 and the Q counter 32 are used. The B counter is a 7 state counter which is used to address the 6 bits within each byte, and the Q counter is a 63 state counter that is used to build up the address of a blank block. This is accomplished as follows. The first byte of the tape log is transferred along the log buss 35 and line 26 into the S register. Both counters have been initialized (the B counter to one and the Q counter to 3 which is the address of the first page block on tape) and count pulses are applied along lines 29 and 30 to the B counter to cause it to step through 6 bit times. During the first bit time (the initial state of the B counter) bit one of the S register is sampled, and if that bit is on the B counter is stepped to the next count and bit 2 of the S register is sampled. At the same time that the B counter is counted up one position, the Q counter is also incremented. The B counter 28 would continue to be stepped until a bit in the S register is detected. After one byte of the tape log section has been checked and no zero bit is located, the machine log is shifted one position and the next byte of the tape log section is transferred into the S register. The Q counter is incremented once and the B counter is incremented twice to return it to its initial state. Then the same procedure, continuing to advance the Q counter is repeated. Once a bit in the tape log which contains a zero is located, the bit will be set and the contents of the S register will be transferred back into the machine log. The Q counter will then contain the address of the first blank block on tape. The contents of the Q counter are then inserted into the machine log at the appropriate location and the tape motion control logic is caused to access this block on tape by application of the address along line 42 into the address register 53. The machine log is shifted back to the job log section, to the job character that has been selected, and the block code contained in the Q counter will be placed in one of two positions in the SSR 37 following the job selected. If source recording is being performed, this code will always be inserted in front of the next job character following the job that is selected (at the end of the last page within the job). If a revision job is being performed then this new code will be inserted in front of the first block code that is resident in the buffer (bit 8 on). At the time that the character is put onto the log buss to be inserted into the machine log an access command is given to the tape motion control logic to access this new block.

Figure 9:
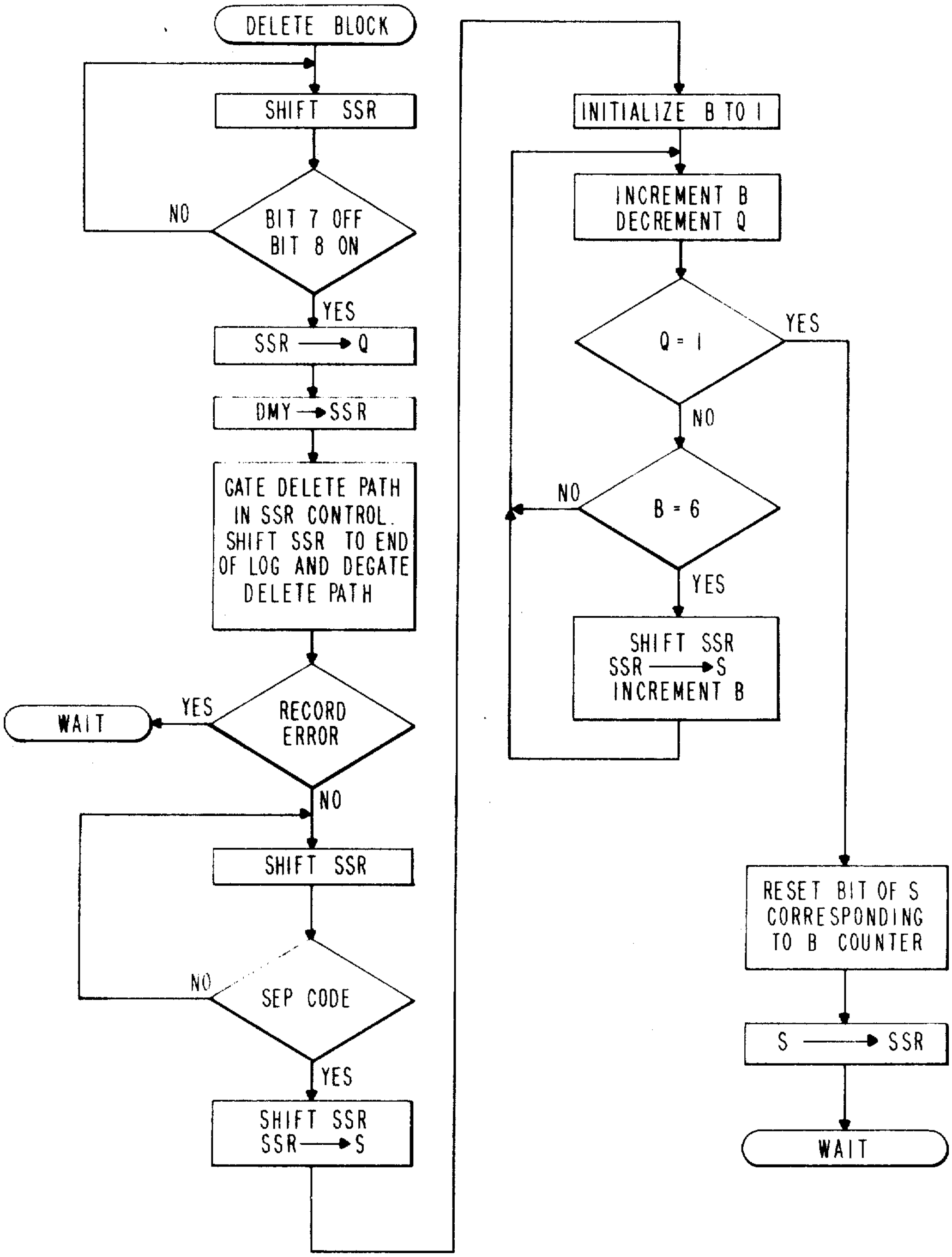
FIG. 9 is a flow diagram of a delete block instruction.

Refer next to FIG. 9. Another type of instruction is to delete a page. To accomplish this one block must be deleted from the job log and the corresponding bit in the tape log section must be reset. There actually may be three different types of instructions that cause page deletes: (1) clear a single page, (2) text clear which may constitute deleting one, two, or more pages at one time as all pages that happen to be in the buffer at the time the operator depressed the clear button are to be deleted, (3) job delete in which case all pages of the job selected are deleted. The last two cases are extensions of a single page clear. To do a page clear the register is shifted into the job log section to the character that is selected and then the first block code that contains bit 8 on is addressed. This code is transferred into the Q counter. At the same time that it is transferred into the Q counter the character in the machine log is replaced with a dummy character. With the use of the control lines 33 as will be described in conjunction with FIGS. 4 and 5 into the static shift register control chip, the dummy code will be moved to the end of the machine log into the rest of the dummy characters. This has removed the block code from the job log section. Now a shift to the beginning of the tape log section is performed and the bit corresponding to that block code is addressed in order to reset it. The procedure now is the reverse of building up an address. The Q counter 32 will contain the code of the block that is being deleted so that the first byte of the tape log is transferred into the S register, then the B counter is used to step through the contents of the S register. Each time that the B counter is incremented and the Q counter is decremented and a check is made on the Q counter to determine if the initial count has been reached. If at the time of sampling the 6th bit, the Q counter is not equal to the initial count, then the log is shifted to the next byte position, and this byte is transferred into the S register, and the B counter is continued to be counted up and the Q counter down. Once the Q counter reaches its initial position the B counter is used to enable the proper bit in the S register to be reset. Once that bit has been reset the S register contents are transferred back into the machine log. This results in the deletion of the block that was in the job log section and the resetting of the proper bit in the tape log section and the page clear operation is complete.

Another type of instruction would result from a record error when an attempt is made to store a page on tape. If the systems tried to record on this block and there is a hard error, (we continued to get some kind of a data check error after trying to record on that block three times) this block will be flagged as being unusable. An instruction will be given to the machine log control that we have got a recrod error and it is known that the block that we have attempted to record is the first block code with the bit 8 on in the job log section. This block code will be deleted from the job log section and the corresponding bit will not be reset in the tape log section. The tape log section will still indicate that the block is being used preventing it from being used in the future, but yet that block code will not appear anywhere in the job log section.

To end a job, the operator keys a job end from the keyboard, and a job end instruction is applied to the machine log. In this case, all of the eight bits that are on within the job are reset including the job character and any bit 8 of any page block that do not need to be recorded. Normally before the instruction to do the job end, the system would initiate repeated store operations to record the pages, so that the job end in most cases will consist of just resetting bit 8 of the job character. If the machine log needs to be recorded back on tape at the end of the job there will be an instruction given to position the tape to the machine log block. The machine log will be shifted to the first job character. An instruction is given, the machine log will be shifted out onto the data buss to be recorded.

One other type of operation is concerned with alerting the operator when the tape is almost full. A tape limit feedback is given to the operator when there is only one more block left on tape. After building an address for a new block, the rest of the tape log section is sampled to see how many zeroes remain. If there are one or less zeroes remaining in the tape log, Tape Limit is set.

Figure 4:
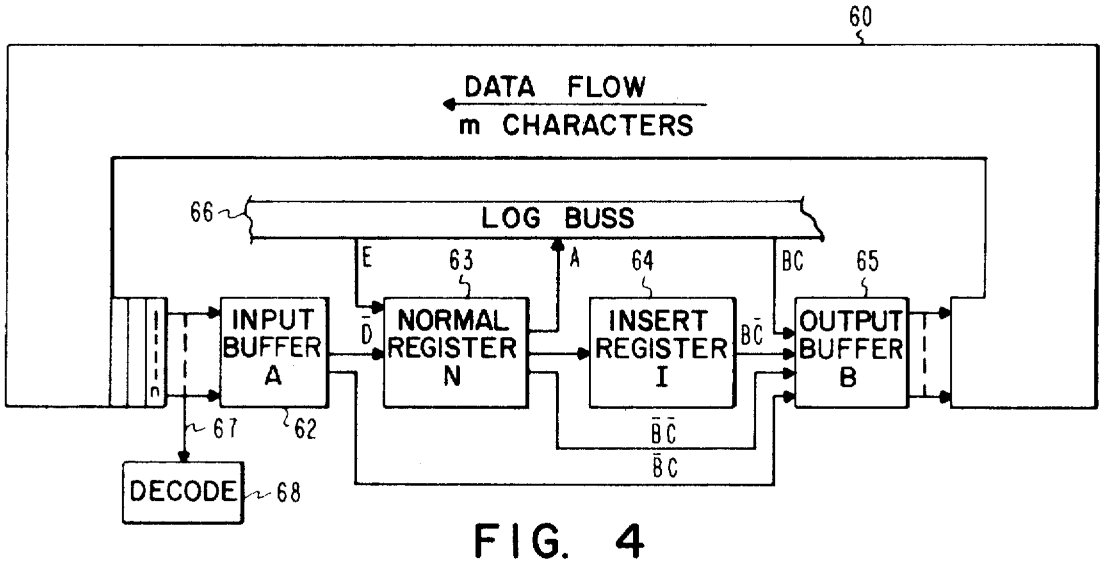
FIG. 4 is a block diagram of the shift register control of FIG. 2.

For a more detailed description of the shift register 40 and control refer next to FIG. 4.

As shown in FIG. 4, a shift register 60 has a data flow in the counter clockwise direction such that the output of the register is applied to an input buffer 62 labeled A. The output register is applied along line 67 to a decode unit 68 which decodes the characters and provides an indication to the control logic, not shown, as to which characters are at the output of the register. As will later be discussed in more detail, the control codes which facilitate the highly simplified logical control hereinafter described include dummy codes, separator codes, and the state of specific bits in the characters. The output from the input buffer A can be applied under logical control to line $\bar{B}$ C which causes the data to flow from input buffer A to an output buffer 65. Additionally, data from the input buffer 62 may be applied along line $\bar{D}$ to normal register 63.

Normal register 63 is, as shown, connected along line A to a data buss 66. Data buss 66 in turn is connected along line BC to the output buffer 65 and along line E to the normal register. The normal register 63 is as shown connected along line $\bar{B}\,\bar{C}$ to the output buffer 65 and is also connected to the insert register 64. The insert register 64 is also connected along line B $\bar{C}$ to the output buffer 65. These various lines such as $\bar{B}\,\bar{C}$ are labeled in accordance with the logical control signals which must be applied to control the flow of the data along the designated path. These notations are in accordance with those used in the detailed schematic of FIG. 5.

Figure 5:
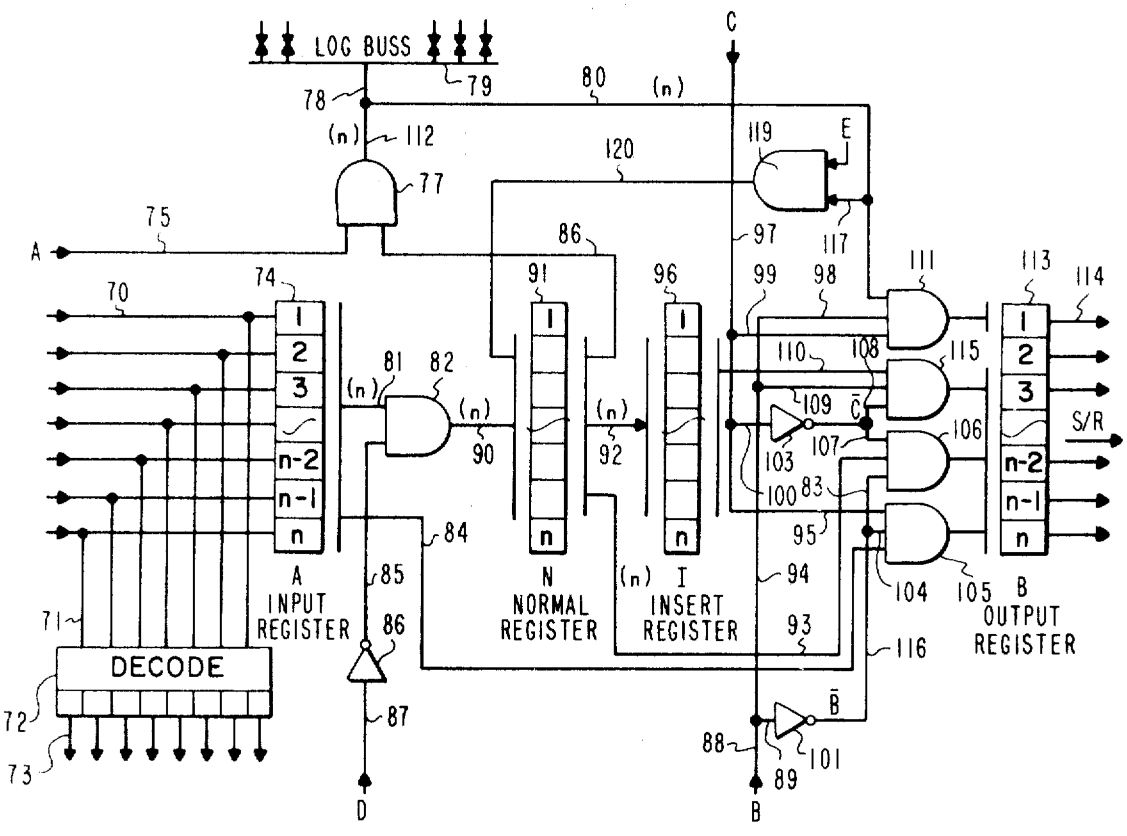
FIG. 5 is a detailed schematic of the shift register control of FIGS. 4 and 2.

For a more detailed description of the subject shift register and control technique, and for an operational description thereof, refer next to FIG. 5. In FIG. 5 are lines 70 which represent the output lines from the output stage of the shift register. Lines 114 are connected to the input stage of the associated shift register. Lines 70 from the output stage of the shift register are applied to the input register 74. The input register 74 is as shown for *n* stages. The output from the shift register applied to lines 70 is also applied along lines 71 to the decode unit 72 which has its output applied along lines 73 to the control logic. As previously discussed, decode unit 72 decodes the characters appearing on the outPut line 70 and provides decoded information to the control logic.

The output from the normal register 91 is as shown applied along line 76 to AND gate 77 which in turn receives the A logical input along line 75 from the control unit. Thus, application of a positive logic logical level to line 75 will cause the character appearing on line 70 to pass through AND gate 77 along lines 112 and 78 to the data buss 79. The data appearing on line 70 is also applied along line 81 to AND gate 82 which receives another input along line 87 through inverter 86 along line 85. Thus, application of a positive logical level to line 87 results in AND gate 82 inhibiting passage of data from the input register 74 onto line 90 and into the normal register 91 while application of a negative logical level or $\bar{D}$ to line 87, acting through inverter 86, causes line 85 to apply a positive logical level to AND gate 82 and thus allow the data from input register 74 to pass into normal register 91.

The contents in the input register 74 are also applied along line 84 and to AND gate 105.

The contents of input register 74 which pass through AND gate 82 and along line 90 into the normal register 91 when a low logical level is applied to line 87 are applied along line 92 to the insert register 96. The same data also passes along line 93 to AND gate 106. The data in insert register 96 is also applied along line 110 to AND gate 115.

As shown, a C logical signal is applied along line 97 to line 99 and 100. Line 99 constitutes another input to AND gate 111 while the signal applied to line 100 through inverter 103 is applied to both AND gates 115 and 106. Further, the B logical signal which is applied to line 88 is also applied along lines 94 and 109 to make up the third input to AND gate 115 and along lines 94 and 98 to make up the third input to AND gate 111. The B logical signal is also applied along line 89, through inverter 101, and along lines 116 and 104 to AND gate 105 and along lines 116 and 83 to AND gate 106. The output of AND gates 105, 106, 111, and 115 are applied to the output register 113 which is connected to the input lines 114 to the associated shift register.

Thus, from the above, it will be seen that application of a positive logical level to the D line 87 will result in the contents of the A input register 74 being inhibited from passing through AND gate 82 while application of low logical level or $\bar{D}$ signal to line 87 will cause the contents of the input register 74 to be passed through AND gate 82 to the normal register 91. Further, the contents of the normal register 91 always are applied to the insert register 96 and are selectively gated into AND gate 115 by application of a positive logical level to line 88 which is the B logical signal along with the application of a low logical level to line 97 which is the C logical signal.

Thus, unless the B signal is true and C signal not true the data in insert register 96 will not pass through AND gate 115 to the output register 113.

In addition, as previously described, when the A logical signal is true the data from the normal register 91 is passed through AND gate 77 to the data buss. For input from the data buss AND gate 111 gates data from the data buss 79 along line 80. This will occur as shown when the B and C logical signals are true. Further, data can be gated directly from the normal register 91 along line 93 through AND gate 106 by application of the $\overline{C}$ signal to AND gate 106 in conjunction with the application of a $\overline{B}$ signal to line 88 which, through inverter 101 is in verted to cause the conditions into AND gate 106 to be met to pass the information from the normal register 91 into the output register 113. Data may also be gated from the data buss 79 along lines 80 and 117 into AND gate 119 and with the application of a logical signal E along line 118, data will be gated on line 120 into the normal register 91. Finally, data from the input register 74 can be passed directly along line 84 through AND gate 105 by application of a $\overline{B}$ signal to line 88 in conjunction with application of a C logical signal. This will cause the data to pass directly from the input register 74 into the output register 113.

It will be appreciated by those skilled in the art that the static shift register must have a shift control line connected to each of the stages. These lines have not been included in FIG. 4 for the purposes of simplicity. Further, it will be appreciated that while a static shift register is used to hold the electronic machine log that other types of serial memory devices could also be used and a random access memory be made to perform this function.

Further while a magnetic tape has been described as the bulk store the system is not intended to be limited to such a media since the machine log concept is applicable to other serial bulk memories as well. For example a magnetic bubble memory or large shift register, provided they in the future become economically feasible, could be used in place of the cassette and drive.

In the above described manner there has been presented a system for printing which allows an operator to define jobs, and pages within jobs which are stored on a serial bulk memory under control of a machine log without a need for the operator to be aware of the position of a job in the bulk store. With the system the operator need only think job and the system by means of the log control automatically controls the accessing and storage on the bulk store in such a way that the serial bulk store is made to act like a relatively expensive random access memory.

While the invention has been particularly shown and described with reference to several embodiments, it will be understood by those skilled in the art that various changes in form and detail may be made without departing from the spirit and scope of the invention.

What is claimed is:

1. In a system having a keyboard for generating character codes and job identifying codes, a buffer connected to said keyboard for storing said character codes, a serial bulk memory divided into storage blocks and connected to said buffer in two-way communication therewith, selective accessing means connected to said serial bulk memory for accessing said storage blocks, and automatic assigning means connected to said selective accessing means for automatically assigning particular ones of said storage blocks for storing on said blocks characters stored in said buffer in response to said job identifying codes, said automatic assigning means including an electronic log and a log in a portion of said serial bulk memory, both of said logs including indicia representative of available storage blocks, block address codes of storage blocks previously assigned, and said job identifying codes, the improvement comprising:

means connected to said automatic assigning means for automatically distinguishing said block address codes from said job identifying codes, each of said codes including n bits, said means including;

means for automatically setting a bit in a particular one of the n bit positions of each of said job identifying codes; and means for automatically resetting a bit in said particular one of said n bit positions of each of said block address codes, whereby job identifying codes are distinguished from block address codes upon the decoding of a set bit in said particular bit position.

2. The system of claim 1 further comprising means for automatically setting another particular bit position of one of said job identifying codes and said other particular bit position of each block address code corresponding to the pages of said one of said job identifying codes, said means automatically setting said other particular bit position in response to the generation by said keyboard of said one of said job identifying codes.

3. The system of claim 2 wherein said indicia of said electronic log and said log stored in said serial bulk memory further comprises a separate bit corresponding to each storage block in said serial bulk memory;

means for automatically and selectively setting at least one of said bits to indicate the unavailability of its corresponding storage block in said serial bulk memory; and means for automatically and selectively resetting at least one of said bits to indicate the availability of its corresponding storage block in said serial bulk memory.

4. The system of claim 3 wherein said automatic assigning means includes a sequential sampling means connected to said electronic log for sampling each separate bit in said electronic log corresponding to a storage block in said serial bulk memory and a counting means connected to said sampling means which is incremented once for each sample until a reset bit in said electronic log corresponding to an available storage block in said serial bulk memory is located, with the count in said counting means then corresponding to the next available storage block address.

5. The system of claim 3 wherein said automatic assigning means includes a sequential sampling means connected to said electronic log for sampling each separate bit in said electronic log corresponding to a storage block in said serial bulk memory and a counting means connected to said sampling means which is decremented once for each sample, wherein a deletion of one of said storage blocks previously assigned is effected by inserting the count corresponding to the address of the storage block to be deleted into said counter, enabling said sequential sampling means, decrementing said counter once for each sample until said counter reaches its initial state, and resetting the bit just sampled when said counter reaches its initial state.

* * * * *